(12) United States Patent
Kurian et al.

(10) Patent No.: US 10,812,460 B2
(45) Date of Patent: Oct. 20, 2020

(54) VALIDATION SYSTEM UTILIZING DYNAMIC AUTHENTICATION

(71) Applicant: BANK OF AMERICA CORPORATION, Charlotte, NC (US)

(72) Inventors: Manu Jacob Kurian, Dallas, TX (US); Joseph Benjamin Castinado, North Glenn, TX (US); James P. Scopis, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 243 days.

(21) Appl. No.: 15/860,355

(22) Filed: Jan. 2, 2018

(65) Prior Publication Data
US 2019/0207918 A1 Jul. 4, 2019

(51) Int. Cl.
*H04L 29/06* (2006.01)
*G06F 21/31* (2013.01)

(52) U.S. Cl.
CPC ............ *H04L 63/08* (2013.01); *G06F 21/31* (2013.01); *G06F 2221/2115* (2013.01); *H04L 63/108* (2013.01); *H04L 2463/082* (2013.01)

(58) Field of Classification Search
CPC ... H04L 2463/082; H04L 63/08; G06F 21/31; G06F 2221/2115
See application file for complete search history.

(56) References Cited

U.S. PATENT DOCUMENTS

| | | | |
|---|---|---|---|
| 4,528,442 A | 7/1985 | Endo | |
| 5,774,525 A | 6/1998 | Kanevsky et al. | |
| 6,263,447 B1 | 7/2001 | French et al. | |
| 6,405,318 B1 * | 6/2002 | Rowland | G06F 21/552 726/22 |
| 6,591,265 B1 * | 7/2003 | Erickson | G06F 21/316 |
| 7,234,156 B2 * | 6/2007 | French | G06F 21/31 726/2 |
| 7,620,600 B2 | 11/2009 | Pahl et al. | |
| 7,707,120 B2 | 4/2010 | Dominguez et al. | |
| 7,979,894 B2 | 7/2011 | Royyuru et al. | |
| 8,016,185 B2 | 9/2011 | Modi | |
| 8,136,148 B1 | 3/2012 | Chayanam et al. | |
| 8,141,140 B2 | 3/2012 | Wenzel et al. | |
| 8,151,343 B1 * | 4/2012 | Wang | G06F 21/36 726/19 |
| 8,190,129 B2 | 5/2012 | Ben Ayed | |
| 8,234,499 B2 * | 7/2012 | Abraham | G06F 21/55 713/182 |

(Continued)

OTHER PUBLICATIONS

Search Query Report from IP.com (performed Aug. 26, 2020) (Year: 2020).*

*Primary Examiner* — Sharon S Lynch
(74) *Attorney, Agent, or Firm* — Michael A. Springs; Moore & Van Allen PLLC; Jeffrey R. Gray (57) ABSTRACT

Embodiments are described herein for improved verification utilizing dynamic authentication information. Dynamic authentication may include utilizing dynamic authentication information, which is user information that is personal to the user and that changes over-time, such as over various time periods. This type of dynamic authentic information is readily known to the user, but would be difficult for others to determine. The present invention may be utilized to improve the security of the interactions made by the user due to the dynamic authentication information.

20 Claims, 5 Drawing Sheets

200

SET UP DYNAMIC AUTHENTICATION REQUIREMENTS FOR INTERACTIONS
210

↓

RECEIVE A REQUEST FOR AN INTERACTION IN WHICH A USER IS INVOLVED THAT REQUIRES VALIDATION OF THE USER
220

↓

UTILIZE DYNAMIC AUTHENTICATION TO VALIDATE THE USER
230

↓

VALIDATE THE USER FOR THE INTERACTION WHEN THE RESPONSE FROM THE USER MEETS THE DYNAMIC AUTHENTICATION INFORMATION
240

(56) References Cited

U.S. PATENT DOCUMENTS

| | | |
|---|---|---|
| 8,239,677 B2 | 8/2012 | Colson |
| 8,423,466 B2 * | 4/2013 | Lanc ................ G06Q 20/32 705/44 |
| 8,533,118 B2 * | 9/2013 | Weller ................ G06F 21/31 705/44 |
| 8,548,818 B2 * | 10/2013 | Wagner ............ G06Q 20/4014 705/1.1 |
| 8,572,704 B2 * | 10/2013 | Wankmueller ......... G06Q 20/40 726/7 |
| 8,625,796 B1 | 1/2014 | Ben Ayed |
| 8,732,089 B1 | 5/2014 | Fang et al. |
| 8,793,760 B2 | 7/2014 | Raper |
| 8,806,610 B2 | 8/2014 | Draluk et al. |
| 8,844,005 B2 * | 9/2014 | Jakobsson ............ G06F 21/316 726/6 |
| 8,869,243 B2 * | 10/2014 | McGeehan ........... G06F 21/316 726/4 |
| 8,898,758 B2 * | 11/2014 | Steeves ................ G06F 21/316 726/5 |
| 8,904,506 B1 | 12/2014 | Canavor et al. |
| 8,910,251 B2 | 12/2014 | Shepard et al. |
| 8,918,465 B2 * | 12/2014 | Barak .................... H04L 43/08 709/205 |
| 8,955,058 B2 | 2/2015 | Castro et al. |
| 8,955,066 B1 * | 2/2015 | Ackerman ................ G07F 7/04 726/5 |
| 8,990,909 B2 | 3/2015 | Kelley |
| 8,997,240 B1 * | 3/2015 | Kohen ................ G06F 21/31 726/26 |
| 9,055,029 B2 | 6/2015 | Narendra et al. |
| 9,078,129 B1 * | 7/2015 | Dotan .................. H04W 12/06 |
| 9,223,950 B2 | 12/2015 | Li et al. |
| 9,298,898 B2 | 3/2016 | Koch et al. |
| 9,424,410 B2 | 8/2016 | Ghosh et al. |
| 9,514,407 B1 * | 12/2016 | Dotan ................ G06N 5/022 |
| 9,576,119 B2 * | 2/2017 | McGeehan ........... G06F 21/316 |
| 9,641,502 B2 * | 5/2017 | Steeves ................ G06F 21/32 |
| 9,754,209 B1 * | 9/2017 | Kronrod ................ G06F 21/31 |
| 9,888,377 B1 * | 2/2018 | McCorkendale ....... H04L 63/06 |
| 10,284,567 B2 * | 5/2019 | Todasco ................ H04L 63/083 |
| 10,387,880 B2 * | 8/2019 | Lishok ............ G06Q 20/3224 |
| 10,389,712 B2 * | 8/2019 | Steeves ................ G06F 21/32 |
| 10,462,113 B1 * | 10/2019 | Venkataramani ..... H04L 9/3215 |
| 2003/0154406 A1 * | 8/2003 | Honarvar ........... G06Q 20/4014 726/10 |
| 2004/0083394 A1 * | 4/2004 | Brebner .................. G06F 21/31 726/19 |
| 2006/0156385 A1 | 7/2006 | Chiviendacz et al. |
| 2006/0282660 A1 * | 12/2006 | Varghese ............. G06Q 20/341 713/155 |
| 2007/0094717 A1 * | 4/2007 | Srinivasan ............. G06F 21/36 726/5 |
| 2008/0040276 A1 | 2/2008 | Hammad et al. |
| 2008/0103972 A1 * | 5/2008 | Lanc ................ G06Q 20/32 |
| 2008/0104065 A1 * | 5/2008 | Agarwal ................ G06Q 10/10 |
| 2008/0120507 A1 | 5/2008 | Shakkarwar |
| 2008/0319896 A1 | 12/2008 | Carlson et al. |
| 2009/0006856 A1 * | 1/2009 | Abraham ................ G06F 21/55 713/183 |
| 2009/0305670 A1 * | 12/2009 | DeBoer ................... G10L 17/22 455/411 |
| 2009/0327131 A1 * | 12/2009 | Beenau ................ G06Q 20/32 705/44 |
| 2010/0114776 A1 | 5/2010 | Weller et al. |
| 2010/0122329 A1 * | 5/2010 | Jakobsson ............. G06F 21/316 726/6 |
| 2010/0131772 A1 * | 5/2010 | Atashband ........... G06F 21/121 713/189 |
| 2010/0199338 A1 * | 8/2010 | Craddock ............... G06F 21/31 726/7 |
| 2010/0211996 A1 * | 8/2010 | McGeehan ........... G06F 21/316 726/4 |
| 2010/0211997 A1 * | 8/2010 | McGeehan ........... G06F 21/316 726/4 |
| 2011/0029902 A1 | 2/2011 | Bailey |
| 2011/0153461 A1 | 6/2011 | Royyuru |
| 2011/0231225 A1 | 9/2011 | Winters |
| 2011/0239281 A1 | 9/2011 | Sovio et al. |
| 2012/0079576 A1 * | 3/2012 | Han ...................... G06F 21/316 726/7 |
| 2012/0150973 A1 * | 6/2012 | Barak .................... H04L 63/102 709/206 |
| 2012/0214442 A1 | 8/2012 | Crawford et al. |
| 2012/0216260 A1 | 8/2012 | Crawford et al. |
| 2012/0310836 A1 * | 12/2012 | Eden ................... G06Q 20/04 705/44 |
| 2013/0036457 A1 | 2/2013 | Vandemar |
| 2013/0046645 A1 | 2/2013 | Grigg et al. |
| 2013/0073377 A1 * | 3/2013 | Heath ................... G06Q 30/02 705/14.39 |
| 2013/0073388 A1 * | 3/2013 | Heath ................... G06Q 50/01 705/14.53 |
| 2013/0073463 A1 | 3/2013 | Dimmick et al. |
| 2013/0104197 A1 | 4/2013 | Nandakumar |
| 2013/0110658 A1 | 5/2013 | Lyman et al. |
| 2013/0160098 A1 | 6/2013 | Carlson et al. |
| 2013/0185207 A1 | 7/2013 | Lyons et al. |
| 2013/0268357 A1 * | 10/2013 | Heath .................... H04L 63/00 705/14.53 |
| 2014/0006129 A1 * | 1/2014 | Heath ................... G06Q 30/0222 705/14.23 |
| 2014/0137217 A1 | 5/2014 | Kowalchyk et al. |
| 2014/0189808 A1 * | 7/2014 | Mahaffey ............. H04L 63/083 726/4 |
| 2014/0244514 A1 * | 8/2014 | Rodriguez ............. G06Q 20/42 705/71 |
| 2015/0120549 A1 | 4/2015 | Khalid et al. |
| 2015/0180879 A1 * | 6/2015 | Hardt .................... H04L 63/105 726/4 |
| 2016/0036798 A1 * | 2/2016 | Mulhearn ............... G06F 21/32 726/7 |
| 2017/0053280 A1 | 2/2017 | Lishok et al. |
| 2017/0208061 A1 * | 7/2017 | Steeves ................ H04L 63/0492 |
| 2017/0324752 A1 * | 11/2017 | Todasco ................ H04L 63/083 |
| 2017/0346644 A1 * | 11/2017 | Cambou ................ H04L 63/08 |
| 2019/0132400 A1 * | 5/2019 | Platt ...................... H04L 65/403 |
| 2019/0394212 A1 * | 12/2019 | Todasco ................ H04L 63/123 |

* cited by examiner

VALIDATION SYSTEM UTILIZING DYNAMIC AUTHENTICATION

FIELD

The present invention relates to validating a user, and more particularly using at least dynamic authentication information for the validation of the user.

BACKGROUND

Validating a user is increasingly difficult, especially in view of the fact that interactions between users and/or entities are more frequently occurring apart from one another over the Internet and less frequently face-to-face. Moreover, due to the increase in the frequency of electronic interactions between users and/or entities (e.g., directly with an entity or with a second user through an entity) all types of interactions (e.g., over the Internet and/or face-to-face) are subject to potential security issues. As such, improved validation systems are needed to provide more accurate and more secure authentication of users.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved verification utilizing dynamic authentication information. The verification may be utilized for any interaction, such as but not limited to, accessing secure databases, accessing portals, accessing secure devices, entering into secure interactions, changing user identifiers and/or passwords or other authentication credentials, or to take any other type of action in which a user is validated in order to take a particular action. The validation may occur by authenticating a user utilizing a standalone single authentication factor, or it may be utilized as a portion of a multi-factor authentication process. Regardless of the number authentication factors utilized, at least one of the authentication factors may be a dynamic authentication. Dynamic authentication may include utilizing dynamic authentication information, which is user information that is personal to the user and that changes over-time, such as over various time periods. This type of dynamic authentic information is readily known to the user, but would be difficult for a misappropriator (e.g., person trying to take the place of the user, hold himself/herself as the user, and/or access and/or use data without permission, or the like) to misappropriate (e.g., compromise, or the like) this user information because it is not easily identifiable and it is changes over time.

As will be discussed in further detail herein, the present invention may be utilized to improve the security of the interactions made by the user due to the dynamic authentication information, which may change over time, and may be readily apparent to the user and likely difficult to be misappropriated. Moreover, the speed of interactions may be improved because different levels of authentication may be instituted which would range from not needing authentication, to utilizing dynamic authentication information, to using multiple dynamic authentication information, to utilizing more or less secure dynamic authentication information for the interactions. As such, different levels (e.g., type, availability, frequency, or the like) may be utilized to improve the security, convenience, and/or speed for different interactions. These levels may be determined and/or required by the user and/or the organization based on interaction information (e.g., type of interaction, resources associated with an interaction, parties involved in the interaction, products involved in the interaction, data being accessed by the interaction, or the like). The single factor or multifactor authentication, which includes at least the use of dynamic authentication information, solves at least the technical problem of authenticating a user for an interaction (e.g., over the Internet, at a point of interaction, or the like) with more confidence.

Embodiments of the invention comprise systems, computer implemented methods, and computer program products for authenticating users using one or more authentication factors including at least a dynamic authentication factor. The invention comprises receiving an authentication request to authenticate a user for an interaction, wherein the request is received through a user computer system or an organization system. The invention further comprises identifying dynamic authentication requirements for the interaction. The invention also comprises determining a dynamic authentication inquiry to present to the user in accordance with the dynamic authentication requirements, wherein the dynamic authentication inquiry is a request for user information that changes over a time period. The invention further includes determining dynamic authentication information related to the dynamic authentication inquiry that is stored for the user for the time period, wherein the dynamic authentication information is determined from a third party system or from the organization system. The invention further comprises providing the dynamic authentication inquiry to the user, wherein the dynamic authentication inquiry is provided to the user computer system or the organization system. The invention also includes receiving a dynamic authentication response, wherein the dynamic authentication response is received from the user computer system or from the organization system. The invention further comprises comparing the dynamic authentication response from the user with the dynamic authentication information determined from the third party system or the organization system. The invention validates the user when the dynamic authentication response meets the dynamic authentication information, and invalidates the user the when the dynamic authentication response fails to meet the dynamic authentication information.

In further accord with embodiments of the invention, the user information that changes over the time period comprises dynamic user content consumption information, user environment information, user transaction information, or user technology information.

In other embodiments of the invention, the user information is dynamic user content consumption information, wherein the dynamic user content consumption information comprises content that the user has accessed within the time period.

In still other embodiments of the invention, the user information is dynamic user environment information, wherein the dynamic user environment information comprises environment information located near the user.

In yet other embodiments of the invention, the user information is dynamic user transaction information, wherein the dynamic user transaction information comprises transaction information related to transaction details.

In further accord with embodiments of the invention, the user information is user technology information, wherein the user technology information comprises the user's usage of one or more user computer systems.

In other embodiments of the invention, the dynamic authentication information is determined from accessing the third party system, and wherein accessing the third party system comprises mining publicly available dynamic authentication information or mining private dynamic authentication information with permission from the user.

In yet other embodiments of the invention, mining the private dynamic authentication information comprises utilizing user authentication credentials to access the third party system.

In still other embodiments of the invention, the dynamic authentication information is determined from accessing the organization system, and wherein accessing the organization system comprises mining the dynamic authentication information that stored by the organization.

In further accord with embodiments of the invention, identifying dynamic authentication requirements for the interaction comprises receiving user credentials from the user; identifying the user based on the user credentials; identifying the interaction; and identifying the dynamic authentication requirements based on the user and the interaction.

In other embodiments of the invention, the dynamic authentication requirements are stored for the user, the interaction, or an organization involved in the interaction.

In yet other embodiments of the invention, identifying dynamic authentication requirements for the interaction further comprises determining a trigger for presenting the dynamic authentication inquiry; determining interaction information for the interaction; comparing the interaction information with the trigger information; and presenting the dynamic authentication inquiry when the interaction information meets the trigger.

In still other embodiments of the invention, receiving the dynamic authentication response from the user comprises automatically receiving the dynamic authentication response from one or more user computer systems.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for improving the confidence in the validation of a user, improving the security associated with identifying the user for validation, and preventing the misappropriation of information (e.g., personal information, organization information, or the like) and resources. The systems, methods, and computer program products provide single or multi-factor authentication including at least dynamic authentication information, which is readily available and known to the user being validated, but is difficult for a misappropriator to access or mine. As such, the validation of the user is more secure than traditional authentication methods. It should be understood that the embodiments of the invention disclosed herein provide a number of different types of dynamic authentication information that may be used to validate the user while improving the security and confidence associated with the authentication process. The present invention solves at least the technical problem of identifying the parties within an interaction that occurs either over the Internet or in-person or any type of network.

Figure 1:
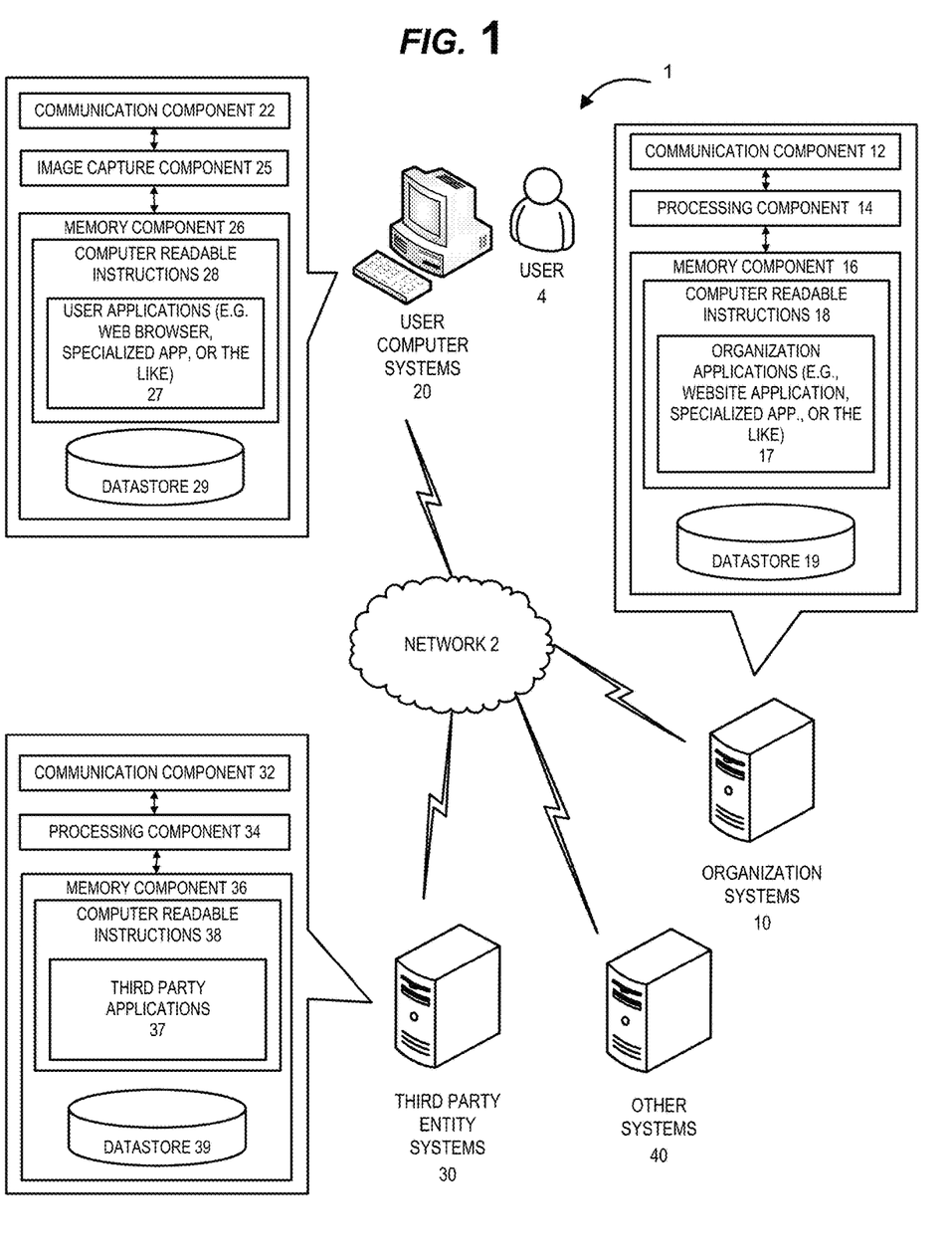
FIG. 1 illustrates a block diagram of an authentication system environment, in accordance with one or more embodiments of the invention.

FIG. 1 illustrates an authentication system environment 1, in accordance with embodiments of the invention. As illustrated in FIG. 1, one or more organization systems 10 are operatively coupled, via a network 2, to one or more user computer systems 20, one or more third-party systems 30, and/or one or more other systems 40. In this way, the user 4 (e.g., one or more associates, employees, agents, contractors, sub-contractors, third-party representatives, customers, or the like), through a user application 27 (e.g., web browser, dedicated or specialized application, or the like), may communicate with an organization application 17 (e.g., website, dedicated or specialized application, point of interaction, or the like) of the organization systems 10 and/or a third party application 37 (e.g., web browser, dedicated or specialized application, point of interaction, or the like) of the third party systems 30, and/or the organization my access the third party systems 30 to determine the dynamic authentication information used to validate the user 4. As will be described in further detail herein the dynamic authentication may include user information that changes over a time period that would be readily available and known to the user, but which would be difficult for a misappropriator to know and/or determine. The improved authentication of the user 4 allows the organization (or user thereof) to interact with the user 4 (e.g., customer, representative of another business, or the like) through the user application 27 with improved confidence of the identity of the user 4. It should be understood that the systems and processes herein are described with respect to the user 4 having an interaction with the organization. However, it should also be understood that the user 4 (e.g., customer, or the like) may interact with another user that works for the organization (e.g., representative of the organization), the user 4 of a first organization (e.g., representative, or the like) may interact with a user of a second organization, the user 4 (e.g., individual) may interact with a second user (e.g., second individual), or any other combination thereof. Moreover, the organization described herein may be the final organization with which the user 4 is interacting, or the organization may be an intermediate organization acting as an intermediary for the final organization. As such, it should be understood that any of the parties of an interaction described herein may be the user, organization, or combination thereof.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the third-party systems 30, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like. Moreover, the one or more communication components 12 may include a keypad, keyboard, touch-screen, touchpad, microphone, mouse, joystick, other pointer component, button, soft key, and/or other input/output component(s) for communicating with the users 4.

As further illustrated in FIG. 1, the organization systems 10 comprise computer-readable instructions 18 stored in the memory component 16, which in one embodiment includes the computer-readable instructions 18 of the organization application 17 (e.g., secure website application, secure dedicated application, or the like). In some embodiments, the one or more memory components 16 include one or more data stores 19 for storing data related to the organization systems 10, including, but not limited to, data created, accessed, and/or used by the organization application 17. The organization application 17 may be an application that is specifically used to validate the user 4 for the organization (e.g., as an intermediary organization for another organization, or directly for the organization) or it may be the application that the user is trying to access directly.

As illustrated in FIG. 1, users 4 may access the organization application 17, third party applications 37, or other applications, through a user computer system 20. The user computer system 20 may be a desktop, mobile device (e.g., laptop, smartphone device, PDA, tablet, watch, wearable device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the organization systems 10, the third-party systems 30, and/or other systems 40. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other apps that allow the user 4 to take various actions, including allowing the user 4 to access applications located on other systems, or the like. In some embodiments, the user 4 utilizes the user computer systems 20 to interact with the organization systems 10, which may utilize dynamic authentication information to authenticate the user 4.

As illustrated in FIG. 1, one or more third-party systems 30 may communicate with the organization systems 10 and/or user computer systems 20 directly or indirectly (e.g., through the organization) with the user 4 in order to provide the dynamic authentication information to the organization for validating the user 4. As such, the third-party systems 30 are operatively coupled, via a network 2, to the one or more organization systems 10, the user computer systems 20, and/or the other systems 40. The third-party systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of organization systems 10, the user computer systems 20, and/or other systems 40. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the third-party systems 30 may have computer-readable instructions 38 stored in the one or more memory components 36, which in one embodiment includes the computer-readable instructions 38 of third party applications 37 that allow for the organization and/or the user 4 to access the third parties, such as to access dynamic authentication information from the third party application 37 in order to validate the user 4, as will be described in further detail herein.

Moreover, as illustrated in FIG. 1, other systems 40 may be operatively coupled to the organization systems 10, the user computer systems 20, and/or the third-party systems 30, through the network 2. The other like systems have components the same as or similar to the components described with respect to the organization systems 10, the user computer systems 20, and/or the third-party systems 30 (e.g., one or more communication components, one or more processing components, and one or more memory devices with computer-readable instructions of one or more applications, one or more datastores, or the like). Thus, the other systems 40 communicate with the organization systems 10, the user computer systems 20, the third-party systems 30, and/or each other in same or similar way as previously described with respect to the organization systems 10, the user computer systems 20, and/or the third-party systems 30.

Figure 2:
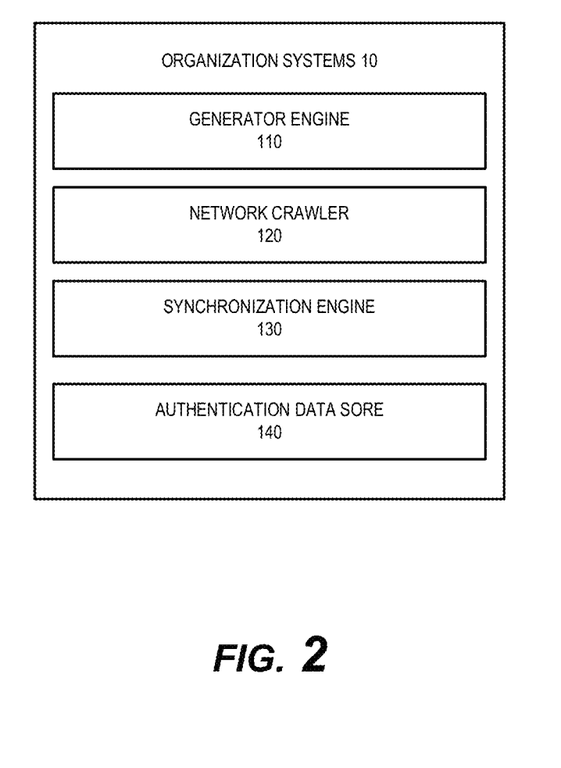
FIG. 2 illustrates a block diagram illustrating various portions of one or more organization systems, in accordance with one or more embodiments of the inventions.

FIG. 2 illustrates the organization system 10 and components/engines thereof, such as a generator engine 110, a network crawler 120, a synchronization engine 130, and/or an authentication data store 140. As will be described herein in further detail herein, the generator engine 110 is utilized to generate the dynamic authentication inquiry that is utilized to validate the user 4. Moreover, the network crawler 120 may be utilized to retrieve and/or confirm data from various sources, such as third party sources or internal sources within the organization. In some embodiments, the third party sources may comprise social media sources, content provider sources, merchant sources, public record sources, semi-private data sources, or the like, which will be described in further detail later. The synchronization engine 130 is utilized to synchronize the data identified by the network crawler 120 and the authentication datastore 140 (e.g., store the most up to date dynamic authentication information, or the like). The authentication datastore 140 stores information, such as the dynamic authentication information, that is used for the dynamic authentication of the user 4.

Figure 3:
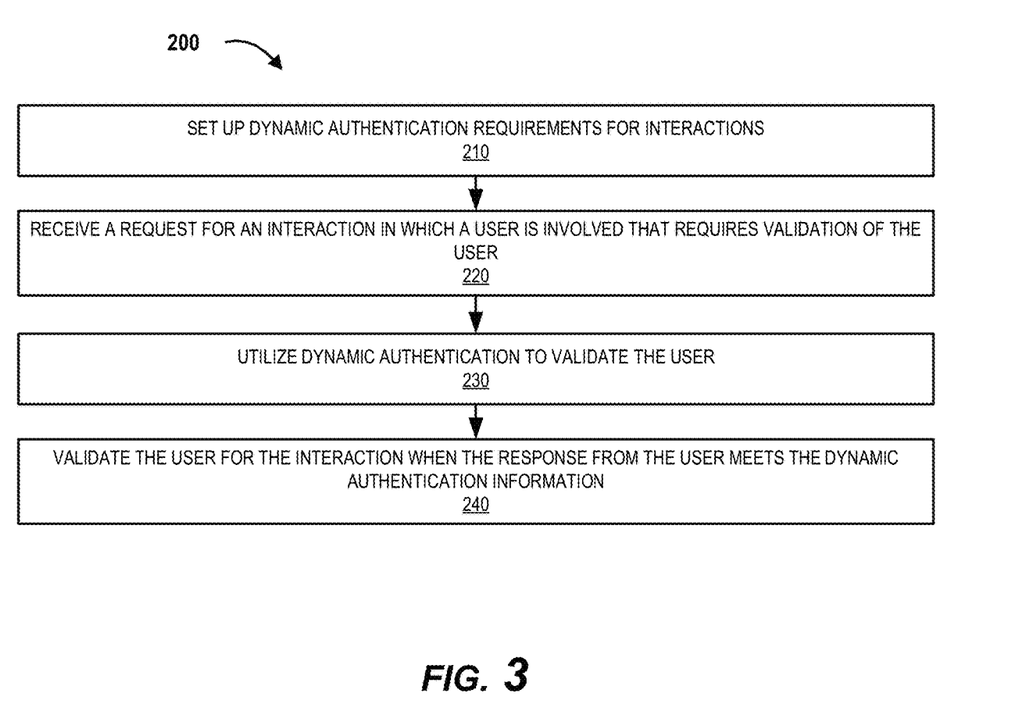
FIG. 3 illustrates a high level process flow for utilizing dynamic authentication information for validation, in accordance with one or more embodiments of the invention.

FIG. 3 illustrates a high level process flow that will be described in further detail with respect to FIGS. 4 and 5. As illustrated by block 210 in FIG. 3, the dynamic authentication requirements may be set up for various interactions. The interactions may be any type of interaction, such as but not limited to accessing a secure system or application, changing a password, entering into a transaction, transferring resources, or the like. Furthermore, the interactions may be face-to-face interactions, interactions over the Internet, and/or at a point-of-interaction location (e.g., face-to-face through a system). Moreover, it should be understood that the dynamic authentication requirements for the interactions may be required as one or more factors of authentication, such as a primary factor of authentication and/or one or more secondary factors of authentication. It should be understood that the dynamic authentication requirements may be set up by the user 4 and/or the organization (e.g., the final entity with which the user 4 is interacting, or the intermediate entity that is communicating with the user 4 on behalf of the final entity). In some embodiments, the dynamic authentication requirements may be required for every interaction regardless of the interaction. Alternatively, the dynamic authentication requirements may include various triggers that indicate when dynamic authentication is required. The triggers may be based on the specific interaction information for the interaction, such as the organization involved in the interaction (e.g., end organization, intermediary organization, representative of the organization, or the like), an amount of resources associated with the interaction, the type of data that the user 4 is trying to access through the interaction, the duration of the interaction, or any other feature of the interaction. Moreover, different types of interactions may have different dynamic authentication requirements (e.g., different levels of authentication, such as the level of difficulty of the dynamic authentication inquires, the number of dynamic authentication inquiries presented, frequency of dynamic authentication inquiries presented over time, or the like). As such, by setting up the dynamic authentication requirements, each of the interactions in which the user 4 may enter may have different dynamic authentication requirements in order to provide different levels of security and/or different protections for different actions.

As illustrated in block 220 of FIG. 3, a request for an interaction is received, which may require single or multi-factor authentication, including utilizing a dynamic authentication inquiry, in order to validate the user 4.

Block 230 of FIG. 3 illustrates that the user 4 may be validated through the use of dynamic authentication. As will be described in further detail later, in order to validate the user 4, one or more dynamic authentication inquiries may be determined. Moreover, dynamic authentication information related to the dynamic authentication inquires is captured by accessing third-parties that provide products (e.g., goods or services) to the user and/or by accessing the internal systems of the organization validating the user 4. The one or more dynamic authentication inquiries, as well as response options in some cases, are presented to the user 4 for authentication.

The user 4 responds to the dynamic authentication inquiry with a dynamic authentication response automatically or manually in order to provide the information for validating the user 4 for the interaction. As illustrated by block 240 in FIG. 3, when the dynamic authentication response from the user meets the dynamic authentication information for the inquiry, the user 4 may be validated for the interaction. However, when the dynamic authentication response fails to meet the dynamic authentication information for the inquiry, the user 4 may be invalidated and/or additional authentication may be required.

Figure 4:
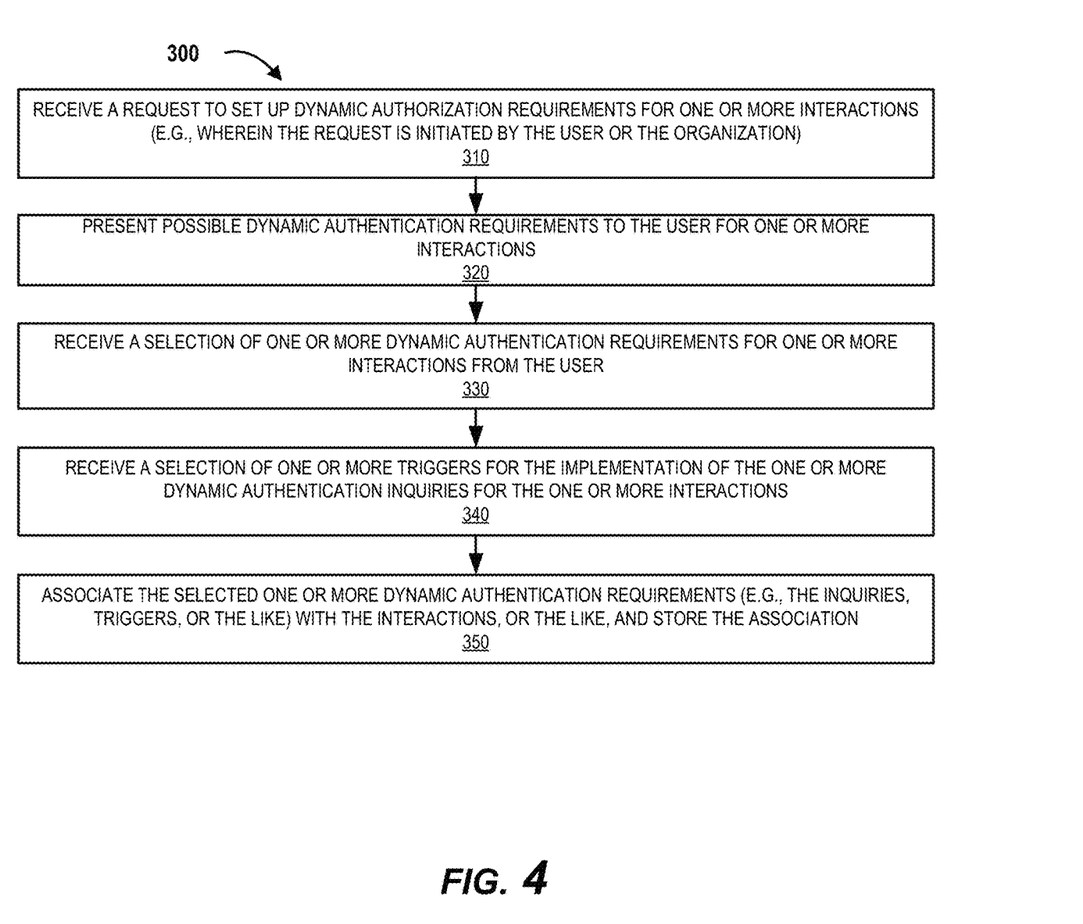
FIG. 4 illustrates a process flow for setting up the dynamic authentication requirements, in accordance with one or more embodiments of the invention.

FIG. 4 illustrates a dynamic authentication set up process, in accordance with embodiments of the invention. As illustrated in block 210 of FIG. 4, a request is received to set up dynamic authentication requirements. It should be understood that the request may be requested by the user on the user's own accord. Alternatively, the request may be originally initiated by the organization and the response from the user beings the process for setting up dynamic authentication requirements. It should be understood that the request may include the interactions for which the user and/or the organization would like to set up the dynamic authentication requirements. It should be also understood, as described above, that the interactions may be transfer of resources, password changes, accessing databases, or other interactions for which the user 4 will be validated. Moreover, the request to set dynamic authentication requirements may be related to one or more interactions (e.g., specific interactions or groups of interactions at the same time).

In some embodiments of the invention, the organization may present possible dynamic authentication requirements (e.g., dynamic authentication inquires, dynamic authentication response options, suggested triggers, or the like for specific types of interactions) to the user 4 for selection, as illustrated in block 320 in FIG. 4. For example, the organization may provide various suggested dynamic authentication inquires to the user 4. In some embodiments the dynamic authentication inquires may include a general or specific dynamic authentication question, a dynamic authentication request, or the like for specific dynamic user information that changes over a time period. In some embodiments the user information may be non-financial related information, may be transaction occurrence information, transaction detail information, and/or a combination thereof. The transaction occurrence information relates to the whether or not the user 4 participated in a transaction. The non-financial information may relate to anything the user 4 does that is not related to whether or not the user 4 actually entered into an interaction that involves exchanging resources for a product. Alternatively, the transaction detail information may relate to details regarding a transaction (excluding the occurrence of the transaction), such as the location (e.g., location, or the like), amount, time, recurrence, or other like transaction information.

It should be understood that unlike static user information, which will not change over time or over long periods of time (e.g., the user's hometown, first pet, childhood friend, mother's maiden name, or the like) the present invention uses dynamic user information that will change over short time periods (e.g., minutes, hours, days, weeks, or the like). This dynamic user information is less likely to be misappropriated because it both occurs over the short time, and changes (e.g., even if it becomes compromised the correct answer changes). Alternatively, the static user information typically is the same or similar across different systems, and as such, should it be misappropriated on one system it can be used on other systems for misappropriation, and it also cannot be used again in the future (e.g., because it doesn't change). It should be understood that different types of user information may be utilized. In some embodiments, the dynamic user information may include dynamic user content consumption information, dynamic user environment information, user transaction information, user technology information, or other like user information. In some embodiments specific user information may cross over between different categories of user information (e.g., may be included in both user environment information and user technology information, or the like).

The dynamic user content consumption may include information related to the content that the user 4 has accessed (e.g., viewed, listened to, watched for a period of time, logged into, or the like), such as videos (e.g., movie, TV show, clip, trailer, short, or the like), audio (e.g., song played, podcast, radio program, or the like), photos (e.g., photos selected within the user's social networking account, photos taken using a mobile device, or the like), websites (e.g., websites visited or signed into), applications (e.g., applications on user's phone, applications logged into, or the like), products (e.g., selected over the Internet, or the like), or other content consumption. The dynamic user content consumption may be based on what was the last content consumed, content consumed over a time period (e.g., hour, week, day, or the like), content most frequented, least frequented, content through which a interaction occurred (e.g., signed on, or the like).

The dynamic user environment information may include locations visited (e.g., stores, buildings, trips, cities, countries, or the like based on a location determination device in a user mobile device), structures viewed (e.g., buildings, parks, monuments, or the like in the user's current view, viewed in the past, or the like based on information captured by the user's mobile device), other people the user was with or around (e.g., other people at a location, last concert, last speaker seen, or the like based on the user's mobile device), images taken (e.g., photos or video created by the user at specific locations, such as captured by the user's device), or other like user environment information. The dynamic user environment information may be based on what environment was visited or accessed last, over a time period (e.g., hour, week, day, or the like), most frequented, least frequented, where an interaction occurred (e.g., located when transaction was made, or the like), or the like.

The dynamic user information may further include user transaction information, which may include the location of a transaction, product associated with the transaction, average cost of the transaction, or the like. Again, the dynamic user transaction information may be based on the transaction that occurred last, over a time period (e.g., hour, week, day, or the like), occurred most frequently, occurs least frequently, where the transaction occurred (e.g., located when transaction was made, or the like), or the like.

The dynamic user information may also include user technology information, such as but not limited to devices used, such as the user's phone, tablet, streaming device, computer, video recorder, video game counsel, watch, smart car, glasses, virtual reality, augmented reality (e.g., request the user to take an action using augmented reality), or the like. As previously described the dynamic user technology information may be based on the device last used, used over a time period (e.g., hour, week, day, or the like), used most frequently, used least frequently, where the device was used (e.g., located when device was used, or the like), or the like.

While certain user information may be described herein, it should be understood that any information that may change over time (e.g., as desired by the user 4 or the organization) may be utilized for the dynamic authentication.

It should be understood that while a misappropriator could potentially determine the user information for a particular point it time, it would be difficult for a misappropriator to determine this information because it changes over time. As such, the use of dynamic user information that changes over time, and the combination of both the user information type and occurrence of the information at the time of the user interaction make it more difficult for a misappropriator to identify and/or use the dynamic user information to misappropriate information. For example, the misappropriator may be able to determine a video that the user 4 watched, but it would be difficult for the misappropriator to determine a video that the user 4 watched two days ago.

Block 330 of FIG. 4 illustrates that a selection of one or more dynamic authentication inquiries are received for one or more interactions. The selection may include the dynamic authentication type (e.g., questions about music), specific dynamic authentication inquiry (e.g., what was the last song you listen to), and/or for which one or more interactions the user would like to require the dynamic authentication type and/or inquiry. The user 4 may assign the use of one or more dynamic authentication inquires to one or more interaction types at the same time. As such, when a particular interaction occurs, the organization system 10 may present the associated dynamic authentication inquiry selected by the user 4. It should be understood that where required, the selection may include permission from the user to access the dynamic user information from a third party system 30. For example, the user 4 may allow the organization to access the user's video accounts (e.g., streaming accounts), music accounts, social networking accounts (e.g., through a connection, such as linked with the organization, or using user credentials, such as using the user password/user ID), accessing the user's location determining device (e.g., in a primary mobile phone of the user, in other secondary devices, or the like), online shopping accounts, or the like. In some embodiments, the organization may be able to mine publicly available information, semi-publicly available information, and/or access the organizations own database for user information that may be used as user information for the dynamic user information. For example, if the organization is a social networking entity, the entity may access internal user information from the user's social networking account. Alternatively, if the organization is a financial institution, it may mine both publicly available social networking account information and access internal transaction information to determine the user's location when the user made a transaction.

As illustrated in block 340 of FIG. 4, a selection of one or more triggers may be received for the implementation of the one or more dynamic authentication inquiries previously selected. The triggers may include limits/approvals for determining when to use the dynamic authentication inquiries for specific interactions, interaction information, users, organizations, or the like. The triggers may be set by the user or the organization. With respect to the user 4, the triggers may be set based on the type of interaction, resource amount associated with the interaction, location of the interaction, time of the interaction, or the like in order to allow the user to forgo triggering the dynamic authentication inquires for every type of interaction. In this way, the user 4 may only require the use of dynamic authentication in situations when the interactions require more security, such as but not limit for large resources transfers, for accessing sensitive information, or the like. Like the user 4, the organization may assign triggers for particular interactions in the same or similar way as described with respect to the user 4. In this way, the organization may require the use of dynamic authentication information for particular types of interactions that require additional security. The level of security may vary depending on threshold of each user and/or organization, and as such the present invention allows each user and/or organization to customize the authentication levels for each interaction based on the comfort level of each user and/or organization for each interaction type.

Block 350 of FIG. 4 illustrates that the selected one or more dynamic authentication requirements (e.g., including the specific inquires, triggers, or the like) are associated with the interactions, and the association is stored for future use. As such, when a request for a specific interaction is received from a user 4, the organization may access the stored dynamic authentication requirements for the interaction, user, organization, or the like in order to determine the dynamic authentication, if any, that is used to validate the user 4.

Figure 5:
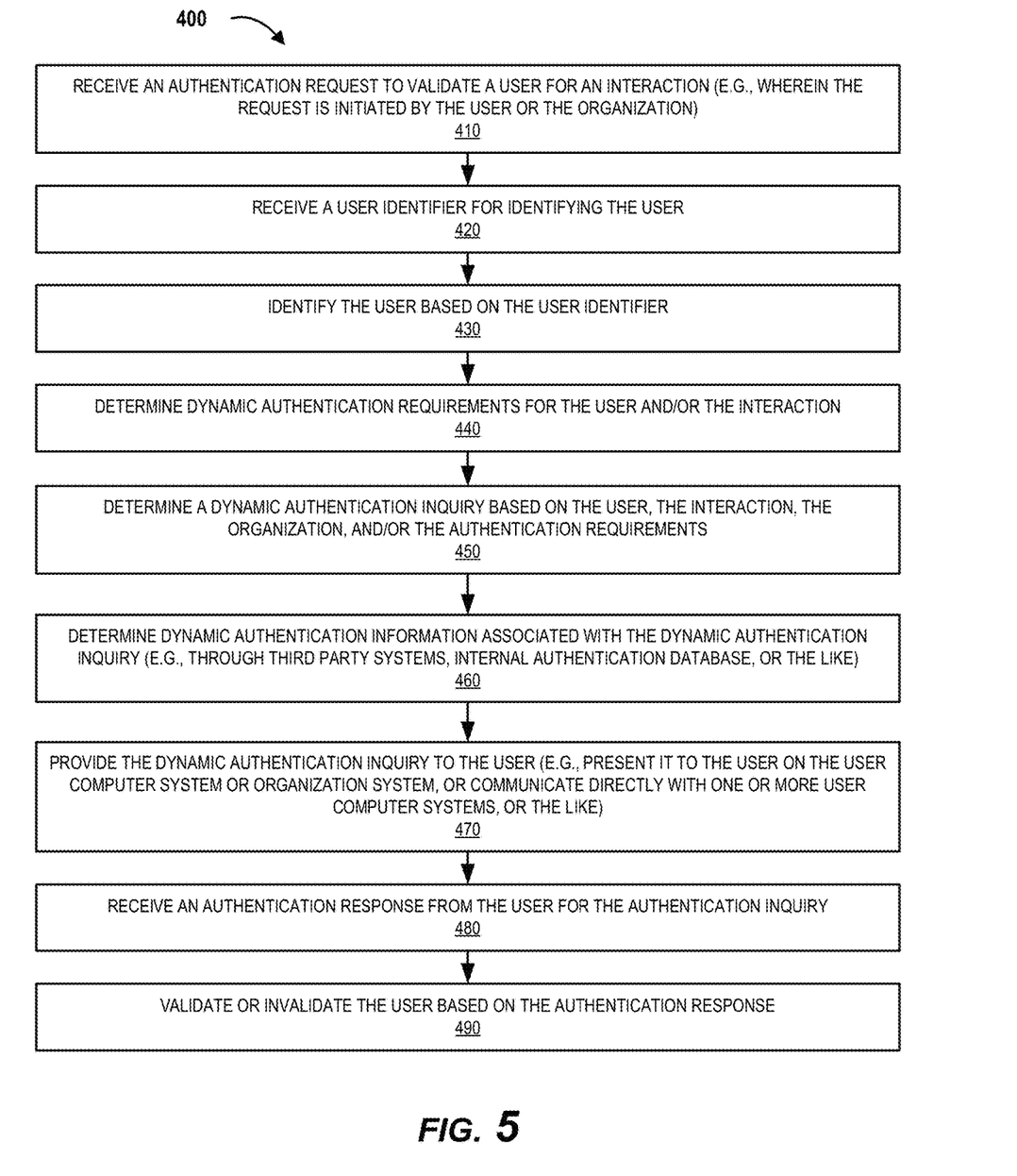
FIG. 5 illustrates a process flow for utilizing dynamic authentication requirements to validate a user for an interaction, in accordance with one or more embodiments of the invention.

FIG. 5 illustrates a detailed dynamic authentication process 400, in accordance with one or more embodiments of the invention. As illustrated by block 410 in FIG. 4, an authentication request is received for an interaction. As previously discussed in block 220 of FIG. 2, the authentication request may be a result of the user entering into an interaction. It should be understood that the request may be received by an organization (e.g., the organization systems 10) directly from the user (e.g., the user computer systems 20) or may be received from an intermediary organization acting on behalf of the user 4 or the final organization involved in the interaction. Alternatively, the organization may initiate the request by communicating with the user 4 and receiving a response from the user 4. The authentication request may be received from the user computer systems 20 or from the user 4 interacting directly with the organization systems 10.

As illustrated by block 420 in FIG. 5, in some embodiments of the invention, a user identifier is received. The user identifier may be anything that can be used to determine the identity of the user. As such, the user identifier may be a user name, user identification, user e-mail, user SSN, user biometric, or the like. The user identifier may be a standalone identifier or it may also include a user credential, such as a password or other user credential. The user identifier may serve as a first authentication factor (e.g., a user ID with a password, or the like) for a validation process. The user identifier may be received through the user computer system 20 and/or through the user 4 interacting directly with the organization system 10.

Block 430 of FIG. 5 illustrates that the user 4 may be identified based on the user identifier. For example, the user identifier may be utilized to associate the user with a resource pool (e.g., account, or the like), list of authorized users, or the like (e.g., with or without actually knowing who the user is) depending on the type of interaction for which the user 4 is being authorized. In some embodiments of the invention, the organization may access the stored user identifier information, or alternatively may access the third party systems 30 to identify the user 4.

FIG. 5 further illustrates in block 440 that dynamic authentication requirements may be determined for the user 4, the interaction, and/or the organization associated with the interaction. For example, the user 4 and/or the organization may have required that for particular interactions there is a trigger for providing a dynamic authentication inquiry as either a primary authentication factor or as one or more secondary authentication factors. The trigger, as previously discussed herein, may be anything for any type of interaction. For example, the trigger may be related to a transaction and may include a threshold resource amount associated with the interaction, a frequency of interactions in a time period (e.g., hour, day, month), a location of the transaction, the organization associated with the interaction, a time of day of the interaction (e.g., at 3 am in the morning, or the like). Alternatively, the trigger may be related to a request to change a user identifier (e.g., a user ID and/or password, or the like). In other embodiments, the trigger may be related to accessing data and may include the same or similar triggers as a transaction (e.g., time of day, location, frequency, or the like) and/or other triggers such as the type of data being accessed, or the like. As previously discussed with respect to FIG. 4, the dynamic authentication requirements (e.g., the triggers regarding when to present the dynamic authentication inquiries) may be stored by the organization, or accessed by the organization from other systems.

In some embodiments the dynamic authentication requirements may include horizontal and/or vertical dynamic authentication requirements for interactions. For example, if an interaction includes resource pools that have joint owners, dynamic authentication may be required for one or more of the joint owners based on the interactions. For example, dynamic authentication may be required for both joint resource pool owners. Moreover, in some embodiments, when an interaction occurs between two users and/or a user 4 and an organization, dynamic authentication may be required for both ends of the interaction (e.g., the user sending resources and the user and/or organization receiving the resources, or the like). For example, when making sure resources are going to the desired user and/or entity the dynamic authentication may be used to provide a more secure interaction for both parties.

Block 450 of FIG. 5 illustrates that a dynamic authentication inquiry may be determined based on the user 4, the interaction, the organization, the authentication requirements, and/or the authentication triggers. The dynamic authentication inquiry may be determined from the one or more dynamic authentication inquires previously selected by the user, as described with respect to FIG. 4 (e.g., if an interaction is accessing sensitive data, if a transaction amount is more than a threshold level, or the like). Alternatively, the dynamic authentication inquiry may be determined from the one or more dynamic authentication inquiries previously determined by the organization for a particular interaction (e.g., if a password is being changed, if the request is coming from out of state, if the request is coming from an unfamiliar user computer system, or the like). As such, the system creates a dynamic authentication inquiry (or access a stored dynamic authentication inquiry) based on the authentication requirements, as described with respect to FIG. 4. For example, the dynamic authentication inquiry may be a question that meets the requirements for a particular interaction involving a user and an organization. The question may be selected from one or more available questions that are stored for a particular interaction and/or user (e.g., multiple questions for the same interaction type may be stored to provide additional levels of security in the variability of the dynamic authentication inquiry). Alternatively, the question may be a specific question that is specifically stored for one or more of the interaction, user, organization, and/or combination thereof.

As an example, the questions may be related to the user information, such user content consumption information, user environment information, user transaction information, user technology information, or other like user information. For example, the questions may be what is the most recent video you watched; what is the song your listen to the most: song X, song Y, or song Z; what is the last road you drove on; what is the last city you visited; when was your last taxi ride; what product did you recently purchase from store A: product M, product N, or product P; what is the last photo you took: photo A, photo B, photo C; what is the last device you used other that your phone: computer E, watch F, computer G; or any other type of question that is not static and which the organization may access because the inquiry changes overtime. Instead of presenting questions to the user, it should be understood that the dynamic authentication inquires may be automatic inquires for the one or more user computer systems 20 (e.g., one or more secondary user devices). It should be understood that these example dynamic authentication inquires (e.g., questions, automatic communication, or the like) are only some of the dynamic authentication inquires that may be utilized. Any type of questions that have answers that change over time may be utilized as the dynamic authentication inquiries.

Block 460 of FIG. 5 further illustrates that the dynamic authentication information associated with the dynamic authentication inquiry identified from block 450 may be determined. It should be understood that the dynamic authentication information may be determined before providing the dynamic authentication inquiry to the user, during providing the dynamic authentication inquiry to the user, or after providing the dynamic authentication inquiry to the user and receiving the response to the dynamic authentication inquiry from the user 4. In some embodiments the dynamic authentication information may be determined before providing the dynamic authentication inquiry to the user 4 in order to determine dynamic authentication inquiry response options. For example, as discussed above, the dynamic authentication inquiry may include questions and multiple choice response options in order to help the user 4 recall the response to the dynamic authentication inquiry. As such, in some embodiments the organization may access third party systems in order to determine the dynamic authentication information for the correct response to the dynamic authentication inquiry. The correct response to the dynamic authentication inquiry may be combined with multiple incorrect responses options before being provided to the user.

As previously discussed above with respect to FIG. 4 in order to determine the dynamic authentication information, the organization and/or organization systems 10 may mine the dynamic authentication information from third parties or from the organization's own internal databases. With respect to the third parties, as previously discussed the system may utilize the user's credentials (e.g., log in credentials, such as user name and password, or the like) in order to access the user's information from the third parties. Alternatively, the organization may have relationships with the third parties that allow the organization to access the user information from the third parties without logging as the user 4. For example, the organization may provide services to the third party that allow the organization to access the data of the third party. In some embodiments, the organization may have the permission of the user 4 to access user information from the user computer systems 20. For example, the user 4 may allow the organization to monitor (e.g., through cookies, or other like connection to the user computer system) the user's user computer systems 20, and/or the use of websites, applications, location, and/or usage of the user computer system (e.g., when, where, duration, and how the systems are used). As such, while the organization may not be able to access the user's actual accounts with third-parties, the organization may monitor the user's use of applications (e.g., streaming services, games, or the like), websites, and/or the user computer systems 10, or the like.

With respect to the organization accessing the organization's own user information, the organization may have user data based on the services that the organization provides to the user. For example, if the organization offers communication services (e.g., telephone, e-mail, SMS, instant message) the organization may have access to the user's communications with other entities (e.g., time, identity, content, or the like of the communications). Alternatively, if the organization offers financial information, the organization may have transaction information related to interactions in which the user participated. Additionally, if the organization offers social media or searching services to the user 4, the organization may have access to the ads and websites that the user visited through the social media and/or searching applications.

The information captured from the third party sources or internally may be combined in order to determine the dynamic authentication information, such as transaction information internally and location information from third parties; transaction information internally and product information from third parties; transaction information internally and user usage information of the computer system (e.g., application or channel through which the transaction occurred); or the like.

It should be understood that there may be a number of different ways that an organization may be able to determine the same or different dynamic authentication information from various external and/or internal sources. In this way the organization may determine the dynamic authentication information response options to present to the user along with the dynamic authentication inquiry and/or the correct response to a dynamic authentication inquiry when it is received from the user and/or user computer system 10.

FIG. 5 further illustrates in block 470 that the dynamic authentication inquiry is provided to the user 4. In some embodiments the dynamic authentication inquiry is presented along with the response options (e.g., multiple choice responses, or the like). The dynamic authentication inquiry may be presented to the user 4 on the user computer systems 20 (e.g., for interactions over the Internet) or may be presented to the user on the organization systems 10 (e.g., for face-to-face interactions).

Block 480 of FIG. 5 illustrates that an authentication response is received from the user 4 for the dynamic authentication inquiry. The response may be received from the user through the user computer systems 20, or from the user 4 or the organization through the organization systems 10 (e.g., point of interaction system, or the like).

Block 490 of FIG. 5 illustrates that the user is validated for the interaction or invalidated based on a comparison of the authentication response with the dynamic authentication information access by the systems (e.g., from third parties and/or from the within the organization).

It should be understood that in some embodiments of the invention the process steps described with respect to blocks 450 through 480 may occur automatically, without the user having to respond to the dynamic authentication inquiry. As such, in some embodiments when a request for an interaction is received by the user 4, the user is identified, and it is determined that dynamic authentication is required for the interaction such that an automatic dynamic authentication process may begin. In one embodiment the user computer system 20 may include preprogramed dynamic authentication responses (e.g., through an application, or other feature). The preprogramed dynamic authentication responses may continuously capture the dynamic authentication information from the third party sources and/or from the user's own user computer systems 20. When a user 4 enters into an interaction with an organization that requires dynamic authentication, the organization systems 10 may automatically access the user computer systems 20 (e.g., mobile phone, watch, or the like) that is being used to enter the interaction and determine the dynamic authentication response to a dynamic authentication inquiry.

In some embodiments it should be understood that the dynamic authentication information may be automatically captured and sent to the organization without the user 4 having to take an action each time the dynamic authentication information is requested for an interaction. For example, in some embodiments the user 4 may enter into an interaction with the organization using one of the user's one or more user computer systems 20. However, because of dynamic authentication requirements associated with the type of interaction (e.g., transfer of resources over a threshold value, or the like) a dynamic authentication response is requested. The dynamic authentication inquiry may be automatically sent to the computer system being utilized for the interaction, and if the correct response is not returned automatically by the computer system 20 being presented or associated with the person requesting the interaction, then person may not be validated for the interaction. As a specific example, a person may be entering into an interaction over the Internet using the user's account number. In response a dynamic authentication inquiry may be sent to the computer system being used to enter into the interaction, if the computer system is not the user's computer system 20 it will not have the answer to the dynamic authentication inquiry (e.g., the last movie watch by the user) because the computer system does not have access to the user's streaming accounts. In another example the user 4 may register a secondary device such that for some interactions the secondary computer system (e.g., watch, phone, car, or other like device) is required to be present for the interaction in order to automatically respond to any dynamic authentication inquiry.

Moreover, for the processes described with respect to FIGS. 4 and 5, it should be understood that instead of the user performing one or more of the actions described therein, another user (e.g., proxy) may take an action on behalf of the user described in FIGS. 4 and 5. As such, for example, a proxy of the user may select the one or more dynamic authentication requirements discussed in block 330, may select the one or more triggers described in block 340, may provide the authentication response discussed in block 480, or take other like action on behalf of the user.

It should be understood that the present invention has technical improvements over traditional authentication (e.g., passwords, biometrics, static response). The present invention determines the dynamic authentication inquires and/or dynamic authentication information for responding to the inquiries. The dynamic authentication information is radially available to the user 4, but would be difficult for a misappropriator to identify. The responses for a single dynamic authentication inquiry changes over time and different types of dynamic authentication inquires may be presented for the same and/or different interactions. Moreover, combinations of multiple dynamic authentication inquiries (e.g., questions and/or automatic responses provided by the user computer systems), such as using two or more dynamic authentication inquires, may be used in place of traditional authentication in order to make interactions more secure and more timely (e.g., automatic responses mean that the user may not even have to log in if there are enough automatic response provided by the user 4 for the interaction). Moreover, even if a misappropriator is able to identify the response to a dynamic authentication inquiry, the response is only good for a short period of time (e.g., because the responses change over time), and the response is only good when that particular inquiry is made (e.g., different inquiries are presented at different times and/or for different interactions). As such, the present invention greatly improves the security of interactions in which a user 4 may want to participate.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for authenticating users using one or more authentication factors including at least a dynamic authentication factor, the system comprising:
   one or more memory components having computer readable code stored thereon; and
   one or more processing components operatively coupled to the one or more memory components, wherein the one or more processing components are configured to execute the computer readable code to:
      receive an authentication request to authenticate a user for an interaction, wherein the authentication request is received through a user computer system or an organization system;
      identify dynamic authentication requirements for the interaction including one or more triggers indicating that dynamic authentication is required, wherein the one or more triggers is based on one or more of the following: the organization system involved in the interaction, an amount of resources corresponding to the interaction, a type of data that the user is trying to access through the interaction and a duration of the interaction;
      upon determining that dynamic authentication is required, determine a dynamic authentication inquiry to present to the user in accordance with the dynamic authentication requirements, wherein the dynamic authentication inquiry comprises a request for user information to be input by the user, wherein the user information requested changes over a time period of minutes, hours, days or weeks between the following categories of user information:
         user content consumption information comprising content including one or more of: a video, audio, a photo, a website, a product or an application, wherein the content of the user content consumption information further comprises one or more of content last accessed by the user, content that is accessed most frequently or content that is accessed least frequently;
         user environment information comprising an image taken by the user at a specific location, wherein the image of the user environment information is one or more of: an image last taken by the user, an image taken most frequently, or an image taken least frequently;
         user transaction information comprising a transaction in which the user participated, wherein the transaction of the user transaction information is one or more of: a user transaction that occurred last, a user transaction that occurs most frequently, or a user transaction that occurs least frequently
      determine dynamic authentication information related to the dynamic authentication inquiry that is stored for the user for the time period based on the user allowing mining of the dynamic authentication information, wherein the dynamic authentication information is determined from a third party system or from the organization system;
      provide the dynamic authentication inquiry to the user, wherein the dynamic authentication inquiry is provided to an interface of the user computer system;
      receive a dynamic authentication response comprising the user information from one or more of the categories of user information, wherein the dynamic authentication response is received from the user through the user computer system or from the organization system;
      compare the dynamic authentication response from the user with the dynamic authentication information determined from the third party system or the organization system;
      validate the user when the dynamic authentication response meets the dynamic authentication information; and
      invalidate the user when the dynamic authentication response fails to meet the dynamic authentication information.

2. The system of claim 1, wherein the request for the user information for the dynamic authentication inquiry presented to the user on the interface is the user content consumption information.

3. The system of claim 1, wherein the request for the user information for the dynamic authentication inquiry presented to the user on the interface is the user environment information.

4. The system of claim 1, wherein the request for the user information for the dynamic authentication inquiry presented to the user on the interface is the user transaction information.

5. The system of claim 1, wherein the mining of the dynamic authentication information is determined from accessing the third party system, and wherein accessing the third party system comprises mining publicly available dynamic authentication information or mining private dynamic authentication information.

6. The system of claim 5, wherein the mining of the private dynamic authentication information comprises utilizing user authentication credentials to access the third party system.

7. The system of claim 1, wherein the mining of the dynamic authentication information is determined from accessing the organization system, and mining the dynamic authentication information stored by an organization.

8. The system of claim 1, wherein identifying the dynamic authentication requirements for the interaction comprises:
   receiving user credentials from the user;
   identifying the user based on the user credentials;
   identifying the interaction; and
   identifying the dynamic authentication requirements based on the user and the interaction.

9. The system of claim 8, wherein the dynamic authentication requirements are stored for the user, the interaction, or an organization involved in the interaction.

10. The system of claim 1, wherein identifying the dynamic authentication requirements for the interaction further comprises:
    determining a trigger for presenting the dynamic authentication inquiry from the one or more triggers;
    determining interaction information for the interaction;
    comparing the interaction information with trigger information; and
    presenting the dynamic authentication inquiry when the interaction information meets the trigger.

11. The system of claim 1, wherein receiving the dynamic authentication response from the user comprises automatically receiving the dynamic authentication response from one or more user computer systems.

12. A computer implemented method for authenticating users using one or more authentication factors including at least a dynamic authentication factor, the method comprising:
receiving, by one or more processing components, an authentication request to authenticate a user for an interaction, wherein the authentication request is received through a user computer system or an organization system;
identifying, by the one or more processing components, dynamic authentication requirements for the interaction including one or more triggers indicating that dynamic authentication is required, wherein the one or more triggers are based on one or more of the following: the organization system involved in the interaction, an amount of resources corresponding to the interaction, a type of data that the user is trying to access through the interaction and a duration of the interaction;
upon determining that dynamic authentication is required, determining, by the one or more processing components, a dynamic authentication inquiry to present to the user in accordance with the dynamic authentication requirements, wherein the dynamic authentication inquiry comprises a request for user information to be input by the user, wherein the user information requested changes over a time period of minutes, hours, days or weeks between the following categories of user information:
user content consumption information comprising content including one or more of: a video, audio, a photo, a website, a product or an application, wherein the content of the user content consumption information further comprises one or more of content last accessed by the user, content that is accessed most frequently or content that is accessed least frequently;
user environment information comprising an image taken by the user at a specific location, wherein the image of the user environment information is one or more of: an image last taken by the user, an image taken most frequently, or an image taken least frequently;
user transaction information comprising a transaction in which the user participated, wherein the transaction of the user transaction information is one or more of: a transaction that occurred last, a transaction that occurs most frequently, or a transaction that occurs least frequently;
determining, by the one or more processing components, dynamic authentication information related to the dynamic authentication inquiry that is stored for the user for the time period based on the user allowing mining of the dynamic authentication information, wherein the dynamic authentication information is determined from a third party system or from the organization system;
providing, by the one or more processing components, the dynamic authentication inquiry to the user, wherein the dynamic authentication inquiry is provided to an interface of the user computer system;
receiving, by the one or more processing components, a dynamic authentication response comprising the user information from one or more of the categories of user information, wherein the dynamic authentication response is received from the user through the user computer system or from the organization system;
comparing, by the one or more processing components, the dynamic authentication response from the user with the dynamic authentication information determined from the third party system or the organization system;
validating, by the one or more processing components, the user when the dynamic authentication response meets the dynamic authentication information; and
invalidating, by the one or more processing components, the user when the dynamic authentication response fails to meet the dynamic authentication information.

13. The method of claim 12, wherein the request for the user information for the dynamic authentication inquiry presented to the user on the interface is the user content consumption information.

14. The method of claim 12, wherein the request for the user information for the dynamic authentication inquiry presented to the user on the interface is the user environment information.

15. The method of claim 12, wherein the request for the user information for the dynamic authentication inquiry presented to the user on the interface is the user transaction information.

16. The method of claim 12, wherein the mining of the dynamic authentication information is determined from accessing the third party system, and wherein accessing the third party system comprises mining publicly available dynamic authentication information or mining private dynamic authentication information.

17. The method of claim 16, wherein the mining of the private dynamic authentication information comprises utilizing user authentication credentials to access the third party system.

18. The method of claim 12, wherein the mining of the dynamic authentication information is determined from accessing the organization system and mining the dynamic authentication information stored by an organization.

19. The method of claim 12, wherein identifying the dynamic authentication requirements for the interaction comprises:
receiving user credentials from the user;
identifying the user based on the user credentials;
identifying the interaction; and
identifying the dynamic authentication requirements based on the user and the interaction.

20. The method of claim 12, wherein identifying the dynamic authentication requirements for the interaction further comprises:
determining a trigger for presenting the dynamic authentication inquiry from the one or more triggers;
determining interaction information for the interaction;
comparing the interaction information with trigger information; and
presenting the dynamic authentication inquiry when the interaction information meets the trigger.

* * * * *